United States Patent
Tsai et al.

(10) Patent No.: US 8,863,120 B2
(45) Date of Patent: Oct. 14, 2014

(54) LAUNCHING A SOFTWARE APPLICATION IN A VIRTUAL ENVIRONMENT

(75) Inventors: Teng-Yu Tsai, New Taipei (TW);
Feng-Chi Hsiao, New Taipei (TW);
Ting-Chieh Lin, New Taipei (TW);
Peng-Zheng Yang, New Taipei (TW);
Teng-Sheng Yu, New Taipei (TW);
Liang-Mao Hung, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 270 days.

(21) Appl. No.: 13/215,239

(22) Filed: Aug. 23, 2011

(65) Prior Publication Data
US 2012/0180049 A1 Jul. 12, 2012

(30) Foreign Application Priority Data
Jan. 12, 2011 (TW) .............................. 100101164 A

(51) Int. Cl.
*G06F 9/455* (2006.01)
*G06F 3/048* (2013.01)

(52) U.S. Cl.
USPC ................ 718/1; 715/763; 715/810; 715/835

(58) Field of Classification Search
None
See application file for complete search history.

(56) References Cited

U.S. PATENT DOCUMENTS

| | | | |
|---|---|---|---|
| 7,478,173 B1 * | 1/2009 | Delco | 709/250 |
| 7,987,432 B1 * | 7/2011 | Grechishkin et al. | 715/778 |
| 2007/0234337 A1 * | 10/2007 | Suzuki et al. | 717/168 |
| 2007/0254604 A1 * | 11/2007 | Kim | 455/88 |
| 2008/0028071 A1 * | 1/2008 | Miyajima | 709/224 |
| 2009/0204964 A1 * | 8/2009 | Foley et al. | 718/1 |
| 2010/0050128 A1 * | 2/2010 | Chiang et al. | 715/847 |
| 2011/0029971 A1 * | 2/2011 | Yamasaki et al. | 718/1 |
| 2011/0106929 A1 * | 5/2011 | Lee et al. | 709/223 |
| 2012/0054744 A1 * | 3/2012 | Singh et al. | 718/1 |
| 2012/0110514 A1 * | 5/2012 | Trowbridge | 715/853 |

* cited by examiner

*Primary Examiner* — Adam Lee
(74) *Attorney, Agent, or Firm* — Novak Druce Connolly Bove + Quigg LLP

(57) ABSTRACT

In a virtual environment, a virtual machine (VM) host creates and displays one or more application shortcuts in the VM host. An application shortcut correlates to a software application that is installed in a VM guest. When the VM host receives an execution command for the application shortcut from the VM host, the VM host establishes a connection channel between the VM host and the VM guest and transmits a launch request to the VM guest via the connection channel. The VM guest launches the software application in response to the launch request.

14 Claims, 5 Drawing Sheets

Application Shortcut Structure

Icon 1= /mnt/res/1.png

Icon 2= /mnt/res/2.png

VM ID= VM01

MAC Address = 0x00feffee0012

Guest OS= Linux

App Path= /sbin/app/ffox.bat

Parameters= -t -s

FIG. 3

| ARP Table | | |
|---|---|---|
| VM ID | MAC address | IP address |
| VM01 | 0x00feffee0012 | 10.0.0.23 |
| VM02 | 0x00feffee0012 | 10.0.0.48 |
| VM03 | 0x00feffee0012 | 10.0.0.142 |

FIG. 4

LAUNCHING A SOFTWARE APPLICATION IN A VIRTUAL ENVIRONMENT

BACKGROUND

1. Technical Field

The disclosure generally relates to a method and a system for launching a software application in a virtual environment.

2. Description of Related Art

A virtualization technique for a plurality of virtual machines installed on a physical computer can allow each of the virtual machines to run an arbitrary operating system (OS) and arbitrary applications. A typical virtual system can operate multiple virtual machine (VM) guests by installing a VM host with a host OS for operating the VM guests. Each of the VM guests may include a guest OS and one or more software applications installed and executable in the VM Guest. When a user wants to run a particular application in a VM guest, the user needs to boot up his VM guest and launch the target application in the VM guest. The user may further need to input a few parameters to setup a runtime environment for the target application before being launched, which is inconvenient. Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

FIG. 3 illustrates an embodiment of an application shortcut structure.

FIG. 4 illustrates an embodiment of an ARP table.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used herein, refers to logic embodied in hardware or firmware, or to a collection of software instructions, written in a programming language, such as Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
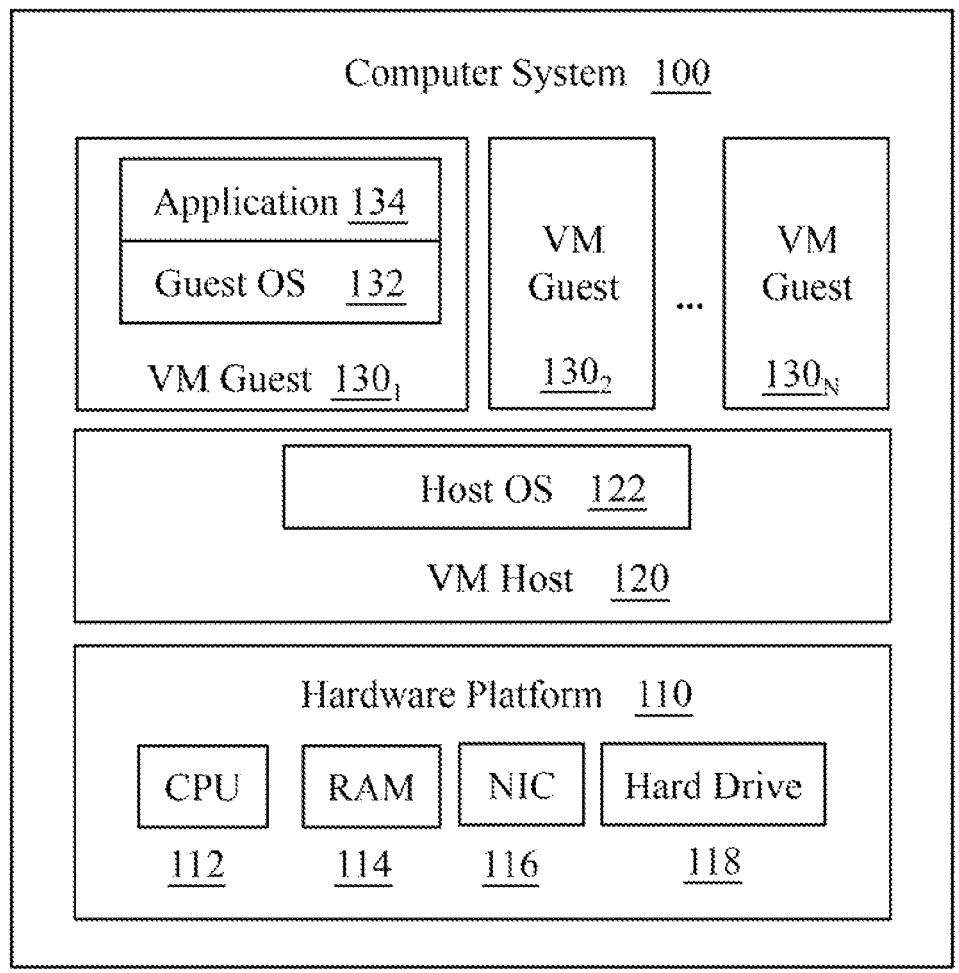
FIG. 1 is a schematic diagram of one embodiment of a computer system in which virtual machines are configured.

FIG. 1 depicts a block diagram of virtual machines configured on a computer system 100. The computer system 100 may be constructed on a desktop, a laptop, or on a server grade hardware platform 110 such as an x86 architecture platform. Such a hardware platform may include a central processing unit (CPU) 112, a random access memory (RAM) 114, a network interface controller (NIC) 116 (also referred to herein as a network card), a hard drive 118 and other I/O devices such as a mouse and a keyboard (not shown in FIG. 1).

The computer system 100 can operate one or more virtual machine (VM) guests $130_1$, $130_2$ ... $130_N$, collectively designated by a reference numeral 130, by installing a VM host 120 with a host operating system (OS) 122 for operating the VM guests 130. Each of the VM guests 130 may include a guest OS and one or more software applications. For example, the VM guest $130_1$ may include a guest OS 132 and an application 134 that is installed and executable in the VM guest $130_1$.

The VM host 120 may control the hardware platform 110, present to the VM guest 130 virtualized hardware resources, and manage the VM guests 130. Multiple instances of the VM guests 130 may share the virtualized hardware resources and each of them may execute programs as if they were hardware.

The VM host 120 may create one or more application shortcuts, each of which correlates with a software application that is installed and executable in one of the VM guests 130. The VM host 120 may position the application shortcuts or any of them in a graphic user interface (GUI) of the VM host 120. A user can launch a particular software application in one of the VM guests 130 through a particular application shortcut.

Figure 2:
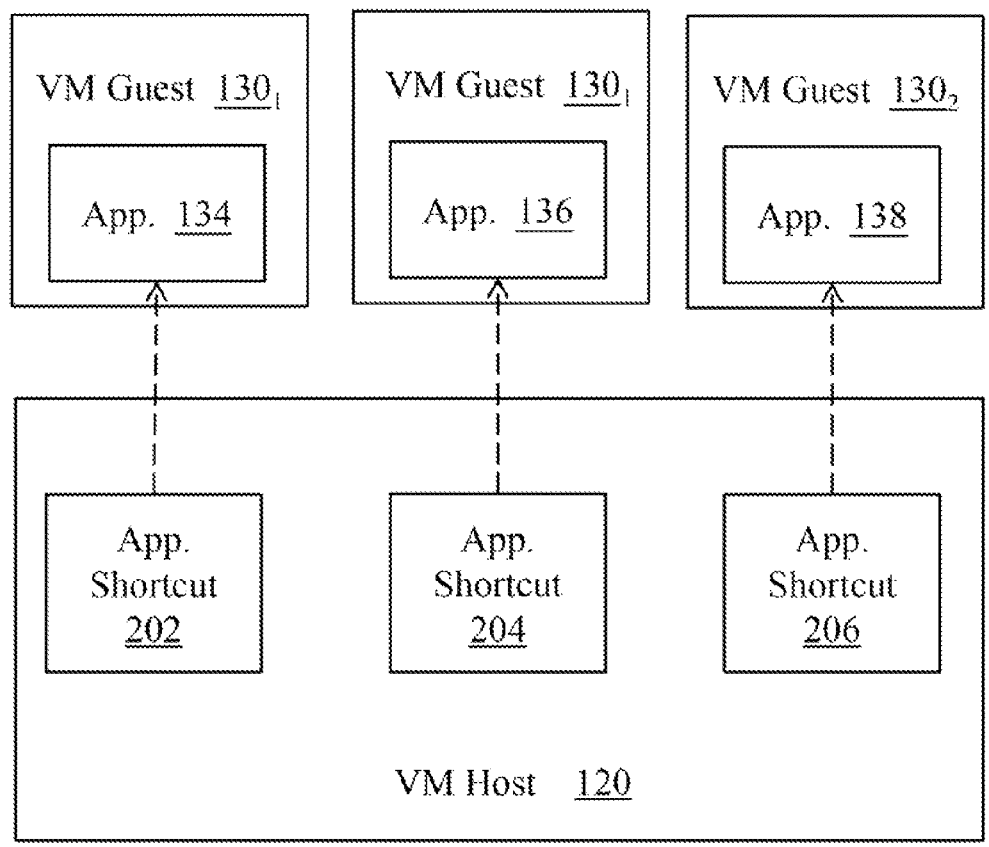
FIG. 2 illustrates a view of one embodiment of a graphic user interface for displaying application shortcuts in a VM host.

In FIG. 2, an embodiment of a graphic user interface (GUI) for displaying the application shortcuts in the VM host 120 is shown. In the embodiment, three application shortcuts 202, 204 and 206 are displayed in the GUI of the VM host 120. The application shortcut 202 points to a software application 134 which is located in the VM guest 1301. The application shortcut 204 correlates with a software application 136 which is also installed in the VM guest 1301. The application shortcut 206 is associated with a software application 138 which is installed in the VM guest 1302.

In FIG. 3, an embodiment of an application shortcut structure is illustrated. The application shortcut structure may store application information which is required for a software application to be launched in the VM guests 130 or any of them. In the embodiment, the application shortcut structure includes a first icon path, a second icon path, a VM ID, a MAC address, a guest OS type, an application path, and parameters. The first icon path and the second icon path provide two icons which may be displayed in the GUI of the VM host 120 to represent the application shortcut. The VM ID is an identification key to identify a unique VM guest. The MAC address of each VM guest is recorded by the VM host 120 when the corresponding VM guest is created. Each of the VM guests 130 has a unique MAC address which can be recognized in a local area network (LAN) or a wide area network (WAN). The guest OS type specifies which OS supports the correlated software application. The application path points to a path where the correlated software application is installed in a VM guests which is identified by the VM ID. The parameters are used to set the initiation command for the correlated software application.

The computer system 100 may assign a unique IP address for each of the VM guests 130, manually or automatically. The computer system may create an Address Resolution Protocol (ARP) table that stores and maintains the IP addresses of the VM guests 130. In FIG. 4, an embodiment of an ARP table is shown. The IP address of a VM guest can be found in the ARP table according to either the VM ID or the MAC address of the VM guest.

The VM host 120 may display the first icon in the GUI of the VM host 120 to represent the application shortcut when the software application correlated with the application shortcut is on standby. When one of the VM guests 130 is launching the software application, the VM host 120 may display the second icon in the GUI of the VM host 120 in place of the first icon. The VM host 120 may inform the user of the current status of a software application by the display of a different icon.

When the VM host 120 receives an execution command for one target application shortcut in the GUI, the VM host may read the application information from the target application shortcut structure. According to the application information, the VM host 120 may determine a target software application and a target VM guest from among the VM guests 130. The VM host 120 can acquire an IP address of the target VM guest by querying the ARP table based on the MAC address or the VM ID of the target VM guest. The VM host 120 may check the status of the target VM guest. If the target VM guest is inactive, the VM host 120 may activate the target VM guest. If the target VM guest is already active, the VM host 120 can establish a connection channel between the VM host 120 and the target VM guest. In one embodiment, the connection channel is based on Transmission Control Protocol (TCP).

The VM host 120 may generate a launch request for launching the target software application in the target VM guest and transmit the launch request to the target VM guest via the connection channel.

When the target VM guest receives the launch request, the target VM guest may launch the target software application.

Figure 5:
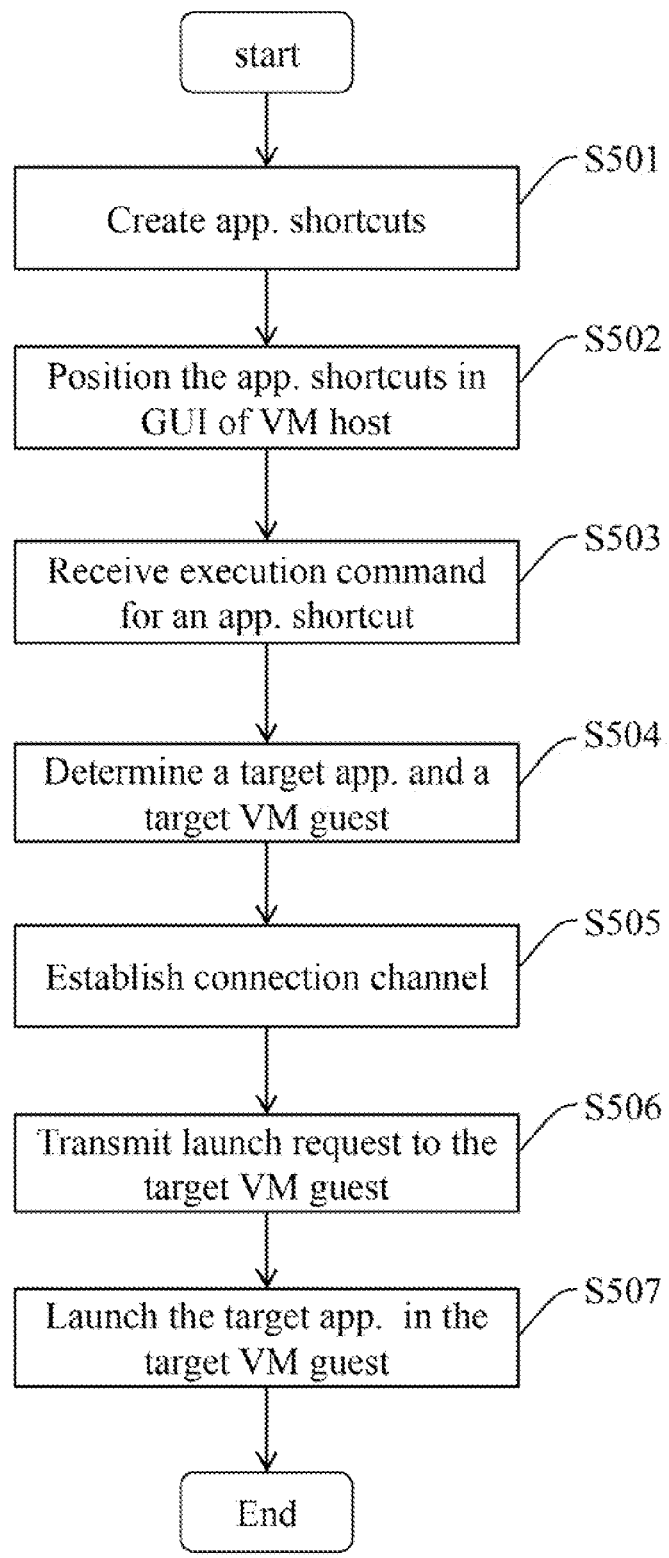
FIG. 5 is an operational flow diagram representing an embodiment of a method of launching a software application in the computer system of FIG. 1.

FIG. 5 is a flowchart illustrating one embodiment of a method of launching a software application in the computer system of FIG. 1. The method may include the following steps.

In step S501, the VM host 120 creates one or more application shortcuts, each of which correlates with a software application that is installed and executable in one of the VM guests 130.

In step S502, the VM host 120 positions the application shortcuts in a GUI of the VM host 120.

In step S503, the VM host 120 receives an execution command for one target application shortcut in the GUI.

In step S504, the VM host reads the application information from the target application shortcut structure. In accordance with the application information, the VM host 120 determines a target software application and a target VM guest from among the VM guests 130.

In step S505, the VM host 120 acquires an IP address of the target VM guest by querying the ARP table for the MAC address or the VM ID of the target VM guest. The VM host 120 checks the status of the target VM guest. If the target VM guest is inactive, the VM host 120 activates the target VM guest. If the target VM guest is active, the VM host 120 establishes a connection channel between the VM host 120 and the target VM guest. In one embodiment, the connection channel is based on TCP.

In step S506, the VM host 120 generates a launch request for launching the target software application in the target VM guest and transmits the launch request to the target VM guest via the connection channel.

In step S507, the target VM guest launches the target software application in the target VM guest.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

Depending on the embodiment, certain steps or methods described may be removed, others may be added, and the sequence of steps may be altered. It is also to be understood that the description and the claims drawn for or in relation to a method may include some indication in reference to certain steps. However, any indication used is only to be viewed for identification purposes and not as a suggestion as to an order for the steps.

What is claimed is:

1. A method for launching a software application in a computer system, the computer system having a virtual machine (VM) host and a VM guest instantiated on the VM host, the software application being installed and executable within the VM guest, the method comprising:
   creating an application shortcut in the VM host, wherein the application shortcut stores application information identifying the VM guest and an application path which points to a path where the software application is installed in the VM guest;
   positioning the application shortcut in a graphic user interface (GUI) of the VM host;
   receiving an execution command for the application shortcut in the GUI by the VM host;
   establishing a connection channel between the VM host and the VM guest;
   transmitting a launch request to the VM guest via the connection channel by the VM host in response to receiving the execution command; and
   launching the software application by the VM guest in response to the launch request;
   wherein when the software application is not launched by the VM guest, displaying a first icon representing the application shortcut in the GUI of the VM host, and when the software application is launched by the VM guest, displaying a second icon in place of the first icon, the second icon representing the application shortcut in the GUI of the VM host.

2. The method of claim 1, further comprising acquiring an IP address of the VM guest by the VM host.

3. The method of claim 2, wherein the step of acquiring the IP address of the VM guest by the VM host comprises:
   obtaining an MAC address of the VM guest; and
   finding the IP address of the VM guest in an Address Resolution Protocol (ARP) table according to the MAC address of the VM guest.

4. The method of claim 1, wherein the connection channel is based on Transmission Control Protocol (TCP).

5. The method of claim 1, further comprising activating the VM guest according to a determination that the VM guest is inactive.

6. A computer system comprising:
   a hardware platform comprising at least one processor and a memory;
   a virtual machine (VM) host running on the hardware platform;
   a VM guest instantiated on the VM host;
   a software application that is installed and executable within the VM guest;
   an application shortcut storing application information identifying the VM guest and an application path which points to a path where the software application is installed in the VM guest, the application shortcut being positioned in a graphic user interface (GUI) of the VM host;

wherein the VM host is adapted to establish a connection channel between the VM host and the VM guest and transmit a launch request to the VM guest via the connection channel in response to an execution command for the application shortcut in the GUI, and the VM guest is adapted to launch the software application in response to the launch request;

wherein when the software application is not launched by the VM guest, the VM host is adapted to display a first icon representing the application shortcut in the GUI of the VM host, and when the software application is launched by the VM guest, the VM host is adapted to display a second icon in place of the first icon, the second icon representing the application shortcut in the GUI of the VM host.

7. The computer system of claim 6, wherein the VM host is further adapted to acquire an IP address of the VM guest before establishing the connection channel.

8. The computer system of claim 7, wherein the application shortcut comprises a MAC address of the VM guest.

9. The computer system of claim 8, further comprising an Address Resolution Protocol (ARP) table that stores the MAC address and the IP address of the VM guest.

10. The computer system of claim 9, wherein the VM host is further adapted to acquire an IP address of the VM guest by querying the ARP table.

11. The computer system of claim 6, wherein the connection channel is based on Transmission Control Protocol (TCP).

12. The computer system of claim 6, wherein the VM host is further adapted to activate the VM guest according to a determination that the VM guest is inactive.

13. A non-transitory storage medium having stored thereon instructions that, when executed by a processor of a computer system, cause the computer system to perform a method for launching a software application, the computer system having a virtual machine (VM) host and a VM guest instantiated on the VM host, the software application being installed and executable within the VM guest, the method comprising:

creating an application shortcut in the VM host, wherein the application shortcut stores application information identifying the VM guest and an application path which points to a path where the software application is installed in the VM guest;

positioning the application shortcut in a graphic user interface (GUI) of the VM host;

receiving an execution command for the application shortcut in the GUI by the VM host;

establishing a connection channel between the VM host and the VM guest;

transmitting a launch request to the VM guest via the connection channel by the VM host in response to receiving the execution command; and launching the software application by the VM guest in response to the launch request;

wherein when the software application is not launched by the VM guest, displaying a first icon representing the application shortcut in the GUI of the VM host, and when the software application is launched by the VM guest, displaying a second icon in place of the first icon, the second icon representing the application shortcut in the GUI of the VM host.

14. The non-transitory storage medium of claim 13, wherein the connection channel is based on Transmission Control Protocol (TCP).

* * * * *